United States Patent
Han et al.

(10) Patent No.: US 10,094,535 B2
(45) Date of Patent: *Oct. 9, 2018

(54) LIGHT DIFFUSING LENS HAVING A LOWER CONCAVE DEPRESSED INCIDENT PORTION AND AN UPPER CONCAVE DEPRESSED REFLECTIVE PORTION AND LIGHT EMITTING DEVICE HAVING THE SAME

(71) Applicant: SEOUL SEMICONDUCTOR CO., LTD., Ansan-si (KR)

(72) Inventors: Jeong A Han, Ansan-si (KR); Eun Ju Kim, Ansan-si (KR); Ki Bum Nam, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 76 days.

This patent is subject to a terminal disclaimer.

(21) Appl. No.: 14/905,234

(22) PCT Filed: Jul. 17, 2014

(86) PCT No.: PCT/KR2014/006513
§ 371 (c)(1),
(2) Date: Mar. 16, 2016

(87) PCT Pub. No.: WO2015/009083
PCT Pub. Date: Jan. 22, 2015

(65) Prior Publication Data
US 2016/0195238 A1    Jul. 7, 2016

(30) Foreign Application Priority Data
Jul. 17, 2013 (KR) .......................... 10-2013-0084327

(51) Int. Cl.
*F21V 5/04* (2006.01)
*G02B 5/02* (2006.01)
(Continued)

(52) U.S. Cl.
CPC .............. *F21V 5/046* (2013.01); *F21V 13/04* (2013.01); *G02B 5/02* (2013.01); *G02B 6/12* (2013.01);
(Continued)

(58) Field of Classification Search
CPC . F21V 5/04; F21V 5/046; F21V 13/04; F21V 7/0091
(Continued)

(56) References Cited

U.S. PATENT DOCUMENTS 2,215,900 A * 9/1940 Bitner ...................... F21V 5/04
359/718
5,384,659 A    1/1995 Shikama et al.
(Continued)

FOREIGN PATENT DOCUMENTS

CN    1854770    11/2006
CN    105556355    5/2016
(Continued)

OTHER PUBLICATIONS

International Search Report dated Mar. 19, 2015, in International Application No. PCT/KR2014/013115.
(Continued)

*Primary Examiner* — Robert May
(74) *Attorney, Agent, or Firm* — H.C. Park & Associates, PLC

(57) ABSTRACT

Disclosed is a light diffusing lens having a pointing angle distribution focused toward a lateral direction. The disclosed light diffusing lens includes a light entrance portion having a shape which is concave inward from the lower portion of
(Continued)

the light diffusing lens, a reflection portion having a shape which is concave inward from the upper portion of the light diffusing lens, and a light exit portion defined by the outer surface of the light diffusing lens. The light entrance portion has a first convex surface which is convex in an optical axial direction defined by a straight line passing through the center of the light diffusing lens as it goes toward the inside of the light diffusing lens.

9 Claims, 8 Drawing Sheets

(51) Int. Cl.
*G02B 6/12* (2006.01)
*G02F 1/1335* (2006.01)
*F21V 13/04* (2006.01)

(52) U.S. Cl.
CPC ............ *G02F 1/133606* (2013.01); *G02F 2001/133607* (2013.01)

(58) Field of Classification Search
USPC ........................... 362/311.06, 311.09
See application file for complete search history.

(56) References Cited

U.S. PATENT DOCUMENTS

| | | | | |
|---|---|---|---|---|
| 7,334,933 | B1* | 2/2008 | Simon | F21V 7/0091 362/328 |
| 7,489,453 | B2* | 2/2009 | Chinniah | F21S 48/1233 359/718 |
| 7,549,781 | B2 | 6/2009 | Kim et al. | |
| 7,602,559 | B2* | 10/2009 | Jang | F21V 5/04 359/726 |
| 8,814,391 | B2* | 8/2014 | Koh | G02B 6/0021 313/512 |
| 9,217,854 | B2* | 12/2015 | Wilcox | G02B 17/0856 |
| 9,404,638 | B2* | 8/2016 | Seki | F21V 5/04 |
| 2006/0126343 | A1 | 6/2006 | Hsieh et al. | |
| 2007/0109791 | A1 | 5/2007 | Chinniah et al. | |
| 2008/0151551 | A1* | 6/2008 | Yang | F21V 5/046 362/308 |
| 2009/0129097 | A1 | 5/2009 | Ewert et al. | |
| 2013/0083541 | A1 | 4/2013 | Fang et al. | |
| 2013/0088857 | A1 | 4/2013 | Lee et al. | |
| 2015/0192275 | A1 | 7/2015 | Seo et al. | |
| 2016/0195238 | A1 | 7/2016 | Han et al. | |

FOREIGN PATENT DOCUMENTS

| | | | | |
|---|---|---|---|---|
| JP | 2005-044661 | | 2/2005 | |
| JP | 2009192915 A | * | 8/2009 | ............ G02B 5/021 |
| KR | 10-2006-0067821 | | 6/2006 | |
| KR | 10-2012-0118565 | | 10/2012 | |
| KR | 10-2012-0133153 | | 12/2012 | |
| KR | 10-2013-0061796 | | 6/2013 | |
| KR | 10-2014-0011641 | | 1/2014 | |
| TW | 200827617 | | 7/2008 | |
| WO | 2012/132043 | | 10/2012 | |

OTHER PUBLICATIONS

International Search Report dated Nov. 14, 2014, in International Application No. PCT/KR2014/006513.
Non-Final Office Action dated Dec. 27, 2017, in U.S. Appl. No. 15/030,575.
Chinese Office Action dated Feb. 7, 2018, issued in Chinese Patent Application No. 201480050779.6.
Chinese Office Action dated Jan. 22, 2018, issued in Chinese Invention Application No. 201480050959.4 (with unverified English translation).
Final Office Action dated Jun. 29, 2018, issued in U.S. Appl. No. 15/030,575.

* cited by examiner

PTP 200 deg.

PTP 190 deg.

PTP 206 deg.

LIGHT DIFFUSING LENS HAVING A LOWER CONCAVE DEPRESSED INCIDENT PORTION AND AN UPPER CONCAVE DEPRESSED REFLECTIVE PORTION AND LIGHT EMITTING DEVICE HAVING THE SAME

CROSS REFERENCE TO RELATED APPLICATIONS

This application is the National Stage Entry of International Patent Application No. PCT/KR2014/006513, filed on Jul. 17, 2014, and claims priority from and the benefit of Korean Patent Application No. 10-2013-00084327, filed on Jul. 17, 2013, both of which are hereby incorporated by reference for all purposes as if fully set forth herein.

BACKGROUND OF THE INVENTION

Field of the Invention

Exemplary embodiments generally relate to a light diffusing lens and a light emitting device including the same. In particular, exemplary embodiments relate to a light diffusing lens of a light emitting device, which is suitable for a backlight unit of a surface lighting apparatus and a liquid crystal display.

Discussion of the Background

A typical display device includes a direct type backlight unit in which a plurality of light emitting elements is arranged at certain intervals under a substantially plate-shaped object, such as a liquid crystal panel or a diffusive plate, to illuminate the plate-shaped object. In order to achieve uniform illumination of the plate-shaped object using only the plurality of light emitting elements, a large number of light emitting devices must be densely arranged, thereby causing increase in power consumption. Moreover, if there is deviation in quality between the light emitting elements, the plate-shaped object exhibits non-uniform brightness. In order to reduce the number of light emitting elements, a light diffusing lens is provided to each of the light emitting elements to promote light diffusion. In this structure, a light diffusing lens and at least one light emitting element corresponding to the light diffusing lens constitute one light emitting device.

A light emitting device including a typical light diffusing lens has a beam angle distribution of about 80° or less with respect to an optical axis coincident with a central axis of the light emitting device. Although a conventional backlight unit includes a light emitting device having a light diffusing lens, the conventional backlight unit is required to maintain a sufficient distance between the light emitting device and a diffusive plate in order to provide uniform surface light to a liquid crystal panel, thereby causing limitations in achievement of a slim structure.

The above information disclosed in this Background section is only for enhancement of understanding of the background of the inventive concept, and, therefore, it may contain information that does not form the prior art that is already known in this country to a person of ordinary skill in the art

SUMMARY OF THE INVENTION

Exemplary embodiments provide a light diffusing lens having a beam angle distribution focused in a lateral direction thereof.

Exemplary embodiments provide a light emitting device configured to achieve a slim structure of a backlight unit.

Additional aspects will be set forth in the detailed description which follows, and, in part, will be apparent from the disclosure, or may be learned by practice of the inventive concept.

In an exemplary embodiment, a light diffusing lens includes a light incident portion having a concave shape depressed inwards from a lower portion of the light diffusing lens, a reflective portion having a concave shape depressed inwards from an upper portion of the light diffusing lens, and a light exit portion defined by an outer side surface of the light diffusing lens, wherein the light incident portion includes a first convex face bulging in a direction of an optical axis defined by a straight line passing through a center of the light diffusing lens.

The first convex face may have a gradually increasing convexity in an inward direction of the light diffusing lens.

The first convex face may extend from an inner apex of the light incident portion.

The light incident portion may further include a first flat face extending from the first convex face.

The first flat face may extend in a downward or upward direction from the first convex face.

The light incident portion may include a second convex face having a different radius of curvature than the first convex face.

The light incident portion may further include a second flat face in a perpendicular direction with respect to the optical axis of the light diffusing lens.

The light diffusing lens may further include a reflection member disposed on the second flat face and configured to reflect light or an absorption member disposed on the second flat face configured to absorb light.

The reflective portion may include a third convex face bulging in the direction of the optical axis.

The reflective portion may further include a third flat face in a perpendicular direction with respect to the optical axis of the light diffusing lens.

The light diffusing lens may further include a reflection member disposed on the third flat face and configured to reflect light or an absorption member disposed on the third flat face and configured to absorb light.

The light exit portion may include a fourth convex face bulging in an outward direction of the light diffusing lens.

An angle defined between the light exit portion and a lower surface of the light diffusing lens may be about 90° or more.

An angle defined between the light exit portion and the lower surface of the light diffusing lens may be less than about 90°.

In an exemplary embodiment a light diffusing lens includes a light incident portion having a concave shape depressed inwards from a lower portion of the light diffusing lens, a reflective portion having a concave shape depressed inwards from an upper portion of the light diffusing lens, and a light exit portion defined by an outer side surface of the light diffusing lens, wherein the light incident portion includes a first flat face gradually narrowed in an inward direction of the light diffusing lens with respect to a direction of an optical axis defined by a straight line passing through a center of the light diffusing lens.

The light incident portion further includes a second flat face extending from the first flat face.

The first and second flat faces may have different slanted angles with respect to the optical axis.

In an exemplary embodiment, a light emitting device includes a light emitting element, and a light diffusing lens disposed on the light emitting element and including a light incident portion, a reflective portion, and a light exit portion, wherein the light incident portion has a concave shape depressed inwards from a lower portion of the light diffusing lens, the reflective portion has a concave shape depressed inwards from an upper portion of the light diffusing lens, and the light exit portion is defined by an outer side surface of the light diffusing lens, and wherein the light incident portion includes a first convex face bulging in a direction of an optical axis defined by a straight line passing through a center of the light diffusing lens.

In an exemplary embodiment, a light emitting device includes a light emitting element, and a light diffusing lens disposed on the light emitting element and including a light incident portion, a reflective portion, and a light exit portion, wherein the light incident portion has a concave shape depressed inwards from a lower portion of the light diffusing lens, the reflective portion has a concave shape depressed inwards from an upper portion of the light diffusing lens, and the light exit portion is defined by an outer side surface of the light diffusing lens, and wherein the light incident portion includes a first flat face gradually narrowed in an inward direction of the light diffusing lens with respect to a direction of an optical axis defined by a straight line passing through a center of the light diffusing lens.

The light emitting device includes a light diffusing lens, which includes a light incident portion providing uniform light to an entire surface of a reflective portion, the reflective portion reflecting light towards the light exit portion, and a light exit portion emitting light in an outward direction of the light diffusing lens, thereby providing a beam angle distribution focused in a lateral direction of the light emitting device. With this structure, the light emitting device can advantageously realize a slim backlight unit.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
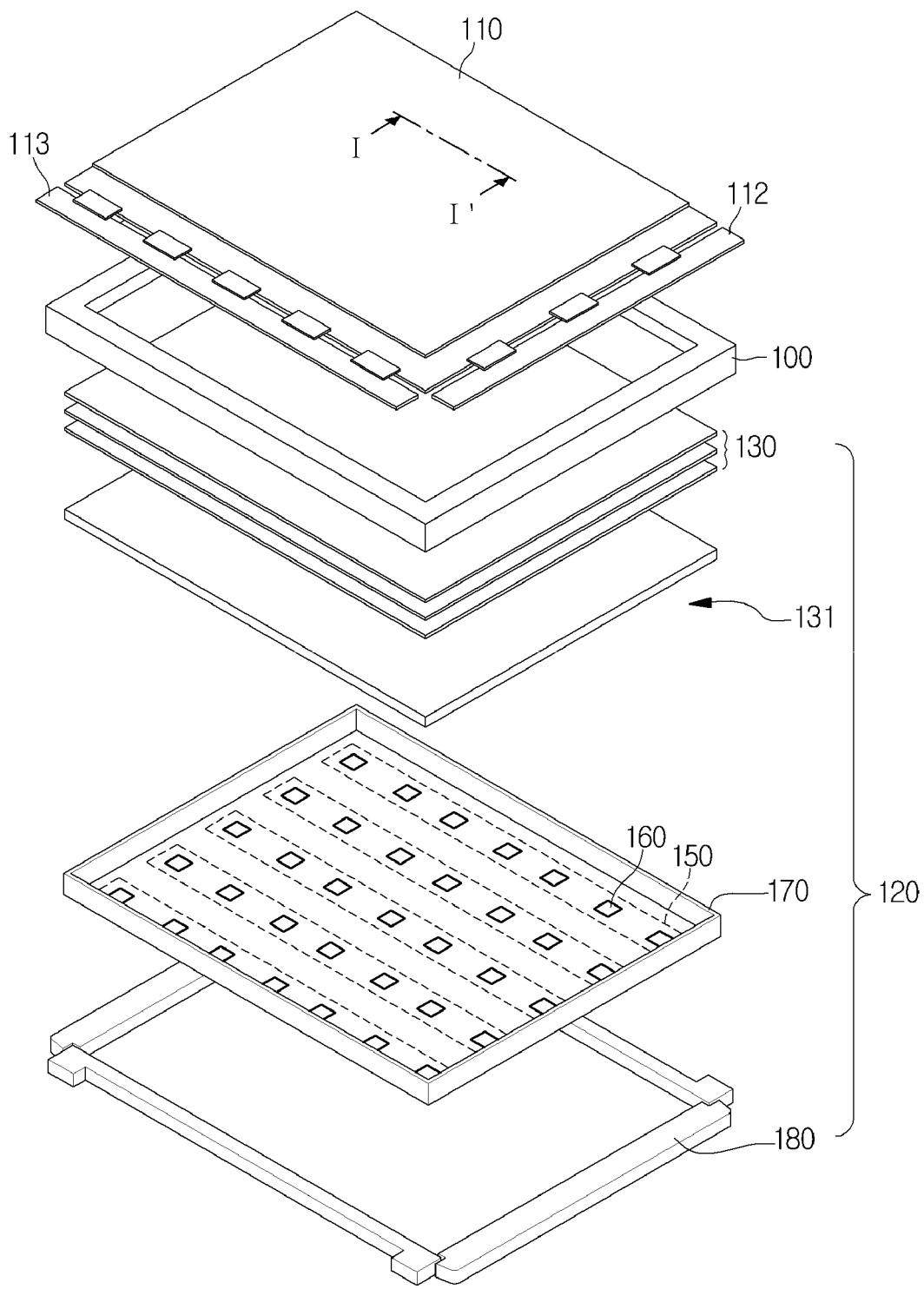
FIG. 1 is an exploded perspective view of a display device including a backlight unit according to a first exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," "right," left," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
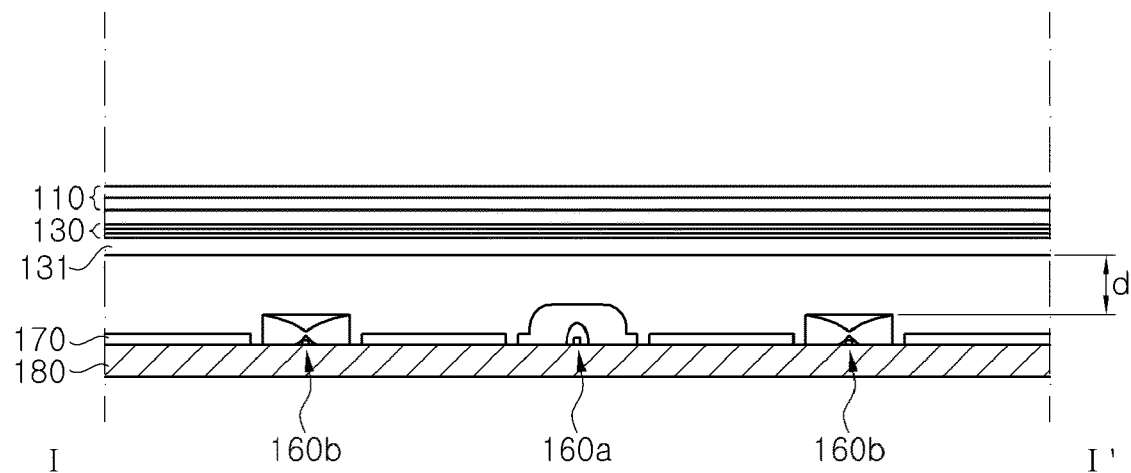
FIG. 2 is a sectional view of the display device taken along line I-I' of FIG. 1.

FIG. 1 is an exploded perspective view of a display device including a backlight unit according to a first exemplary embodiment, and FIG. 2 is a sectional view of the display device taken along line I-I' of FIG. 1.

Referring to FIG. 1 and FIG. 2, the display device according to the first exemplary embodiment includes a display panel 110, a backlight unit 120 emitting light towards the display panel 110, and a panel guide 100 disposed along a lower edge of the display panel 110 to support the display panel 110.

The display panel 110 may be, for example, a liquid crystal display panel including a liquid crystal layer, without being limited thereto. The liquid crystal display panel includes a thin film transistor substrate and a color filter substrate coupled to each other so as to maintain a uniform cell gap while facing each other, and a liquid crystal layer interposed therebetween. The thin film transistor substrate includes a plurality of gate lines and a plurality of data lines, which cross each other to define pixels therebetween, and a thin film transistor is disposed at each intersection between the gate lines and the data lines. The color filter substrate includes a plurality of color filters corresponding to the pixels.

A gate driving printed circuit board (PCB) 112 is disposed at one edge of the display panel 110 to supply drive signals to the gate lines, and a data driving PCB 113 is disposed at another edge of the display panel 110 to supply drive signals to the data lines. Alternatively, the gate driving PCB 112 may be formed on the thin film transistor substrate instead of being formed on a separate PCB. The gate and data driving PCBs 112, 113 are electrically connected to the liquid crystal display panel 110 via a chip-on film (COF). Alternatively, a tape carrier package (TCP) may be used instead of the COF.

The backlight unit 120 includes a bottom cover 180, a plurality of substrates 150, a plurality of light emitting devices 160, a reflective sheet 170, a diffusive plate 131, and optical sheets 130.

The bottom cover 180 is open at an upper side thereof, may receive the substrates 150, the light emitting devices 160, the reflective sheet 170, the diffusive plate 131, and the optical sheets 130 therein, and may be coupled to the panel guide 100.

Although the substrates 150 are illustrated as being arranged on a lower surface of the reflective sheet 170 in the exemplary embodiment, the substrates 150 may be disposed on an upper surface of the reflective sheet 170 when coated with a reflective material.

The plurality of light emitting devices 160 includes a plurality of first light emitting devices 160a and a plurality of second light emitting devices 160b having a different beam angle than the first light emitting devices 160a. Each of the first light emitting devices 160a includes a light diffusing lens that has a beam angle of light traveling in upward and lateral directions thereof. Each of the second light emitting devices 160b includes a light diffusing lens that has a beam angle of light traveling in a lateral direction thereof.

In the backlight unit 120 according to the exemplary embodiment, since mixing and diffusion of light are promoted by the first and second light emitting devices 160a, 160b, which have different beam angle distributions, a distance (d) between the light emitting devices 160 and the diffusive plate 131 can be reduced, thereby providing advantages in achievement of a slim structure.

Although the backlight unit 120 has been described as including both the first and second light emitting devices 160a, 160b in this exemplary embodiment, the backlight unit 120 may employ only the second light emitting devices 160b in other exemplary embodiments.

Details of the second light emitting device 160b according to the exemplary embodiment will be described with reference to FIG. 3, FIG. 4, FIG. 5, FIG. 6, FIG. 7, FIG. 8, FIG. 9, FIG. 10, FIG. 11, FIG. 12, and to FIG. 13.

Figure 3:
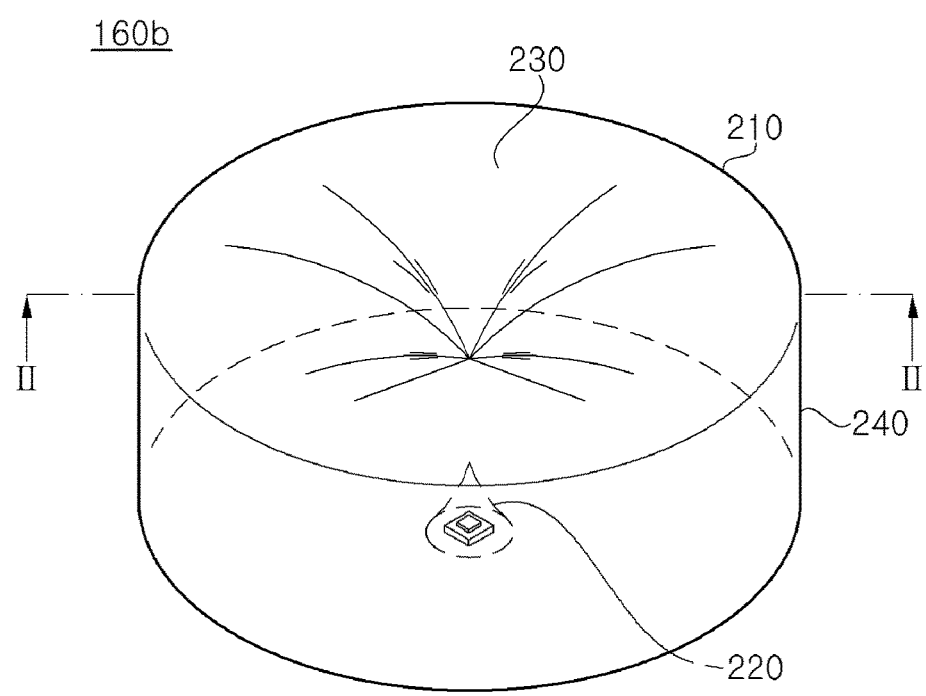
FIG. 3 is a perspective view of a light emitting device according to a first exemplary embodiment.
Figure 4:
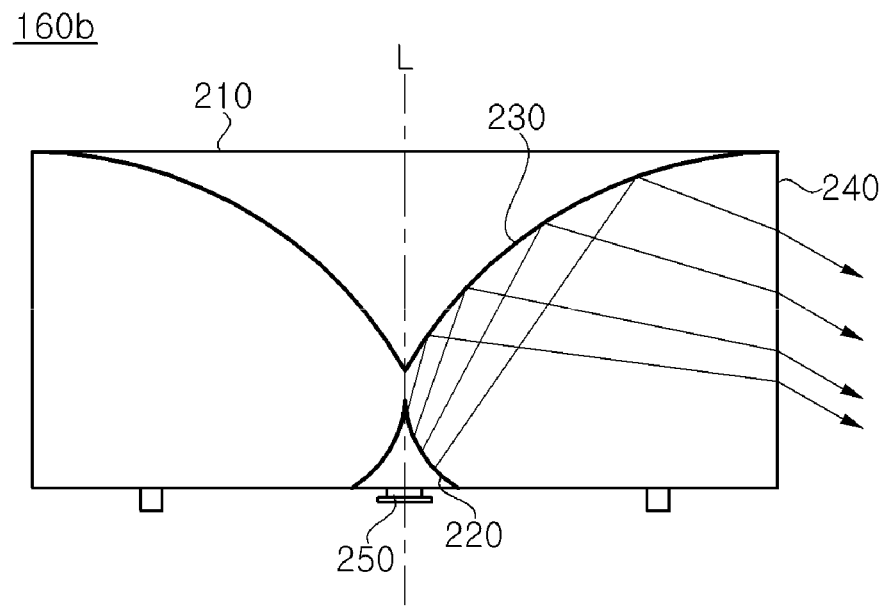
FIG. 4 is a sectional view of the light emitting device taken along line II-II of FIG. 3.
Figure 5:
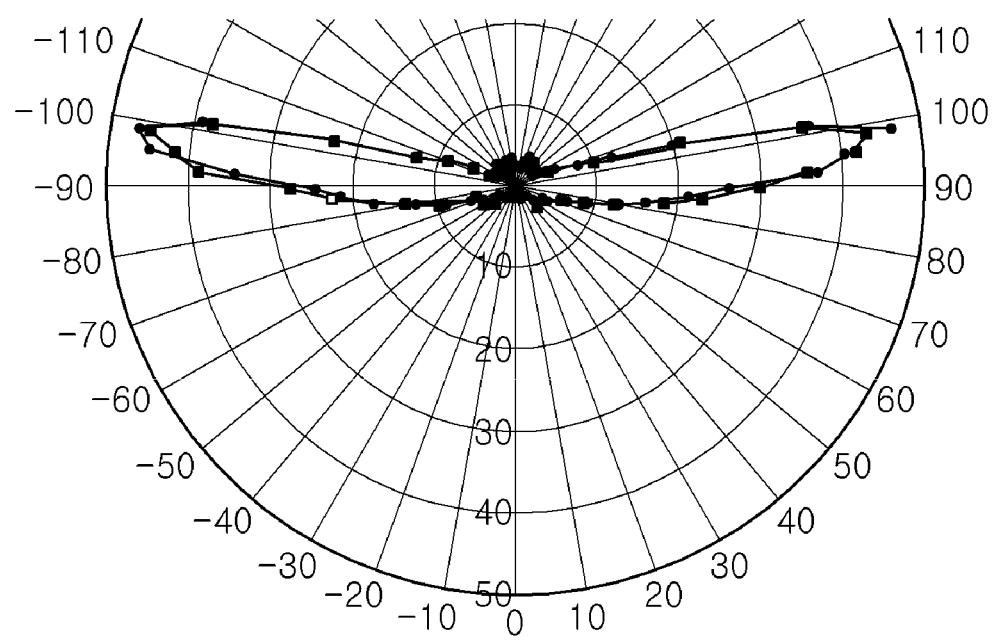
FIG. 5 is a diagram of a beam angle distribution of the light emitting device according to the first exemplary embodiment.

FIG. 3 is a perspective view of a light emitting device according to a first exemplary embodiment. FIG. 4 is a sectional view of the light emitting device taken along line of FIG. 3. FIG. 5 is a diagram of a beam angle distribution of the light emitting device according to the first exemplary embodiment.

Referring to FIGS. 3, 4, and 5, the second light emitting device 160b according to the first exemplary embodiment includes a light emitting element 250 and a light diffusing lens 210.

The light emitting element 250 includes a printed circuit board, which includes conductive patterns (not shown) formed on an upper surface thereof such that terminals of the light emitting element 250 are bonded to the conductive patterns. In addition, the printed circuit board may include a reflective layer formed on the upper surface thereof. The printed circuit board may be a metal-core PCB (MCPCB) based on a metal having good thermal conductivity or an insulating material such as FR4. Although not shown in the drawings, a heat sink may be disposed on a lower surface of the printed circuit board to dissipate heat from the light emitting element 250.

The light emitting element 250 may be composed of a light emitting diode chip (not shown) including a wavelength conversion layer (not shown), and the light emitting diode chip may be directly mounted on the printed circuit board. In the light emitting element 250, the light emitting diode chip (not shown) may be placed within a housing having a cavity, and lead terminals of the light emitting diode chip exposed from the housing may be bonded to the printed circuit board.

The light diffusing lens 210 includes a light incident portion 220, a reflective portion 230, and a light exit portion 240.

The light incident portion 220 serves to provide light to the entirety of the reflective portion 230 by uniformly dispersing light. The light incident portion 220 is placed at a center of a lower surface of the light diffusing lens 210 and has a concave shape depressed inwards from the lower surface of the light diffusing lens 210. The light incident portion 220 corresponds to a region on which light emitted from the light emitting element 250 is incident. The light incident portion 220 is gradually narrowed in an inward direction of the light diffusing lens 210. In particular, the light incident portion 220 is gradually narrowed in an upward direction of the light diffusing lens 210. With respect to an optical axis L defined by a straight line passing through the center of the light emitting element 250, the light incident portion 220 has a convex shape in a direction of the optical axis L. The optical axis L may be coincident with a central axis of the light emitting element 250 and/or the light diffusing lens 210.

The reflective portion 230 is disposed on an upper surface of the light diffusing lens 210 and has a concave shape depressed inwards from the upper surface of the light diffusing lens 210 with respect to the optical axis L. The reflective portion 230 has a function of reflecting light received from the light incident portion 220 towards the light exit portion 240. The reflective portion 230 has a convex shape bulging in the upward direction of the light diffusing lens 210. The height of the reflective portion 230 is higher than that of the light incident portion 220.

The light exit portion 240 is defined by an outer side surface of the light diffusing lens 210 and refracts light reflected by the reflective portion 230. The light exit portion 240 is perpendicular to the lower surface of the light diffusing lens 210. That is, the light exit portion 240 is parallel to the optical axis L and may be composed of a flat face. Although the light exit portion 240 is illustrated as being composed of the flat face in this embodiment, it should be understood that the present disclosure is not limited thereto. Alternatively, the light exit portion 240 may have a convex shape bulging in an outward direction of the light diffusing lens 210. Alternatively, the light exit portion 240 may be composed of a plurality of slanted faces.

The second light emitting device 160b according to the exemplary embodiment has a luminous intensity peak placed at an angle of about 100° from the optical axis L and thus provides a wide distribution of light through light spreading.

The second light emitting device 160b according to the exemplary embodiment includes the light diffusing lens 210, which includes the light incident portion 220 providing uniform light to the entire surface of the reflective portion 230, the reflective portion 230 reflecting light towards the light exit portion 240, and the light exit portion 240 emitting light in an outward direction of the light diffusing lens 210, thereby providing a beam angle distribution focused in a lateral direction of the second light emitting device 160b. With this structure, the light emitting device according to the exemplary embodiment can advantageously include a slim backlight unit when compared to conventional light emitting devices.

Figure 6:
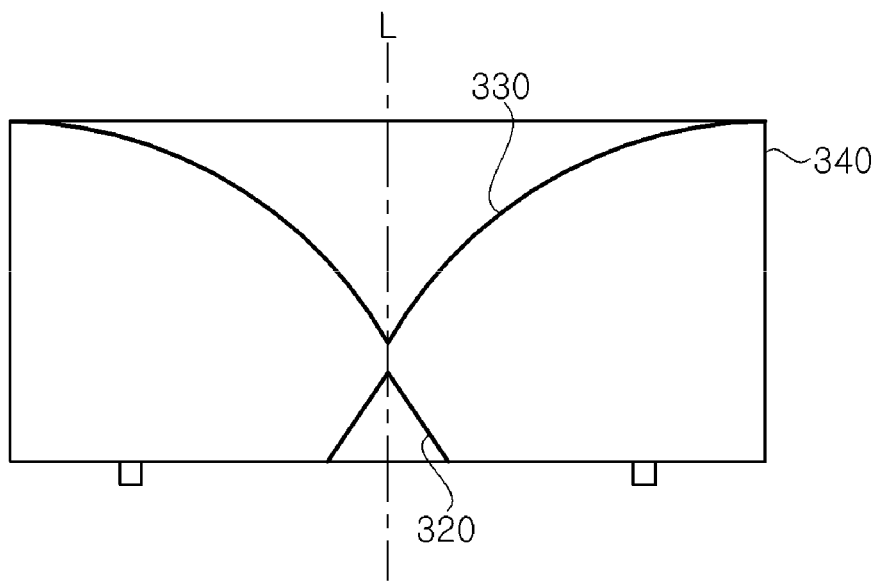
FIG. 6 is a sectional view of a light diffusing lens according to a second exemplary embodiment.

FIG. 6 is a sectional view of a light diffusing lens according to a second exemplary embodiment.

As shown in FIG. 6, a light diffusing lens 310 according to the second exemplary embodiment includes a light incident portion 320, a reflective portion 330, and a light exit portion 340.

The light incident portion 320 has a function of providing light to the entirety of the reflective portion 330 by uniformly dispersing light. The light incident portion 320 is placed at a center of a lower surface of the light diffusing lens 310 and has a concave shape depressed inwards from the lower surface of the light diffusing lens 310. The light incident portion 320 is gradually narrowed in an inward direction of the light diffusing lens 310. In particular, the light incident portion 320 is gradually narrowed in an upward direction of the light diffusing lens 310. The light incident portion 320 has a triangular cross-sectional shape, both sides of which are symmetrical to each other. The light incident portion 320 has a plane-shaped inner surface, both sides of which are symmetrical to each other with reference to an optical axis L defined by a straight line passing through the center of the light emitting element. The optical axis L may be coincident with a central axis of the light emitting element or the light diffusing lens 310.

The reflective portion 330 and the light exit portion 340 are the same as those described and illustrated with respect to the light diffusing lens 210 (see FIG. 3) according to the first exemplary embodiment. Thus, the detailed descriptions of the reflective portion 330 and the light exit portion 340 will be omitted for brevity.

Figure 7A:
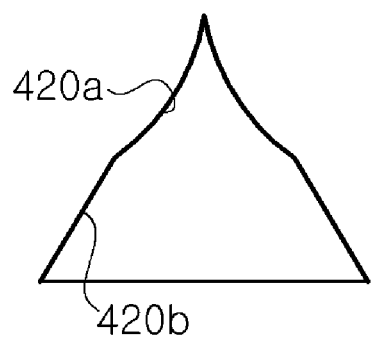
FIG. 7A, FIG. 7B, and FIG. 7C are sectional views of exemplary embodiments of a light incident portion according to the present disclosure.
Figure 7B:
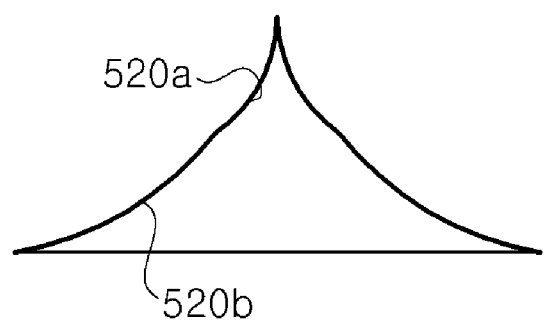
Figure 7C:
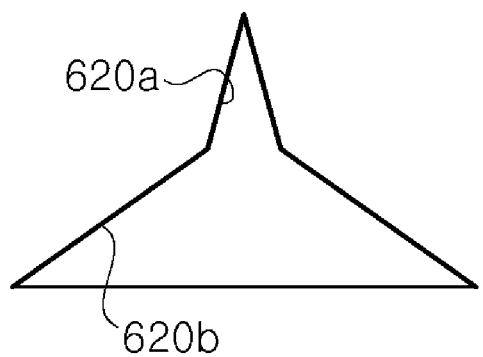

FIG. 7A, FIG. 7B, and FIG. 7C are sectional views of other exemplary embodiments of a light incident portion according to the present disclosure. As shown in FIGS. 7A, 7B, and 7C, the structure of the light incident portion according to the present disclosure may be modified in various ways.

Referring to FIG. 7A, the light incident portion may include a convex face 420a and a flat face 420b when seen in a cross-sectional view thereof. With respect to an inner apex of the light incident portion, the convex face 420a may extend from the inner apex of the light incident portion, and the flat face 420b extends from the convex face 420a and is placed under the convex face 420a. Here, the locations of the convex face 420a and the flat face 420b may be interchanged.

Referring to FIG. 7B, the light incident portion includes first and second convex faces 520a, 520b when seen in a cross-sectional view thereof. With respect to an inner apex of the light incident portion, the first convex face 520a may extend from the inner apex of the light incident portion, and the second convex face 520b extends from the first convex face 520a and is placed under the first convex face 520a. The first and second convex faces 520a, 520b have different radiuses of curvature.

Referring to FIG. 7C, the light incident portion includes first and second flat faces 620a, 620b when seen in a cross-sectional view thereof. With respect to an inner apex of the light incident portion, the first flat face 620a may extend from the inner apex of the light incident portion, and the second flat face 620b extends from the first flat face 620a and is placed under the first flat face 620a. The first and the second flat faces 620a, 620b have different slanted angles. The slated angle may be defined by the degree of inclination with respect to a lower surface of a light incident plane.

It should be understood that the shape of the light incident plane is not limited to the shapes as shown in FIGS. 7A, 7B, and 7C. For example, the light incident plane may be composed of three or more convex faces or flat faces, or a combination of three or more convex faces and flat faces.

Figure 8:
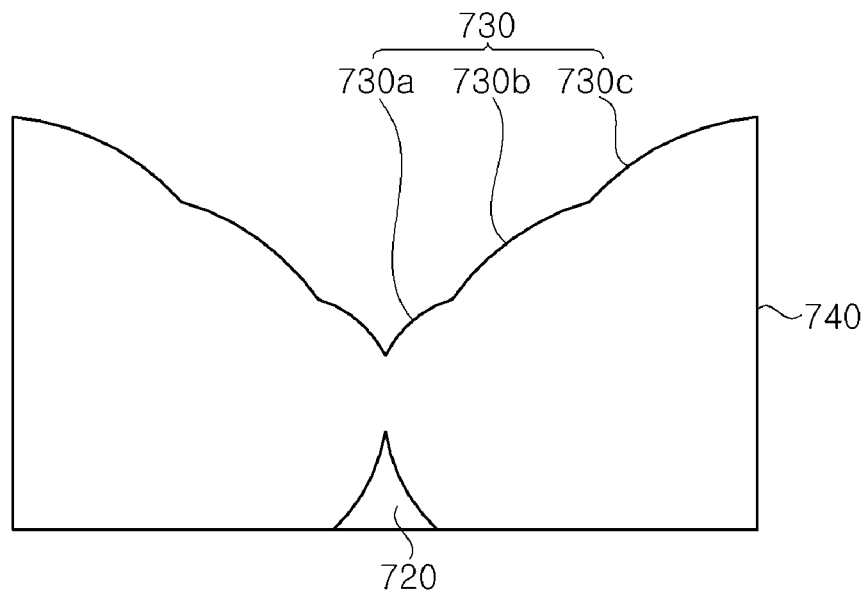
FIG. 8 is a sectional view of a light diffusing lens according to a third exemplary embodiment.

FIG. 8 is a sectional view of a light diffusing lens according to a third exemplary embodiment.

Referring to FIG. 8, a light diffusing lens 710 according to the third exemplary embodiment includes a light incident portion 720, a reflective portion 730, and a light exit portion 740.

The light incident portion 720 and the light exit portion 740 are the same as those described and illustrated with respect to the light diffusing lens 210 (see FIG. 3) according to the first exemplary embodiment. Thus, the detailed descriptions of the light incident portion 720 and the light exit portion 740 will be omitted for brevity.

The reflective portion 730 is placed at an upper portion of the light diffusing lens 710 and has a concave shape depressed inwards from the upper portion of the light diffusing lens with respect to an optical axis L defined by a straight line passing through the center of the light diffusing lens 710. The reflective portion 730 reflects light received from the light incident portion 720 towards the light exit portion 740. The reflective portion 730 includes a first convex face 730a, a second convex face 730b, and a third convex face 730c bulging in a direction of the optical axis L.

The first convex face 730a may extend from an inner apex of the reflective portion 730. The second convex face 730b may extend from the first convex face 730a. The third convex face 730c may extend from the second convex face 730b. The first, second, and third convex faces 730a, 730b, 730c have different radiuses of curvature.

In the light diffusing lens 710 according to the third exemplary embodiment, the first, second, and third convex faces 730a, 730b, 730c having different radiuses of curvature provide a wide distribution of paths of light reflected by the reflective portion 730, whereby the light diffusing lens can have a beam angle distribution focused in a lateral direction of a light emitting device.

Figure 9:
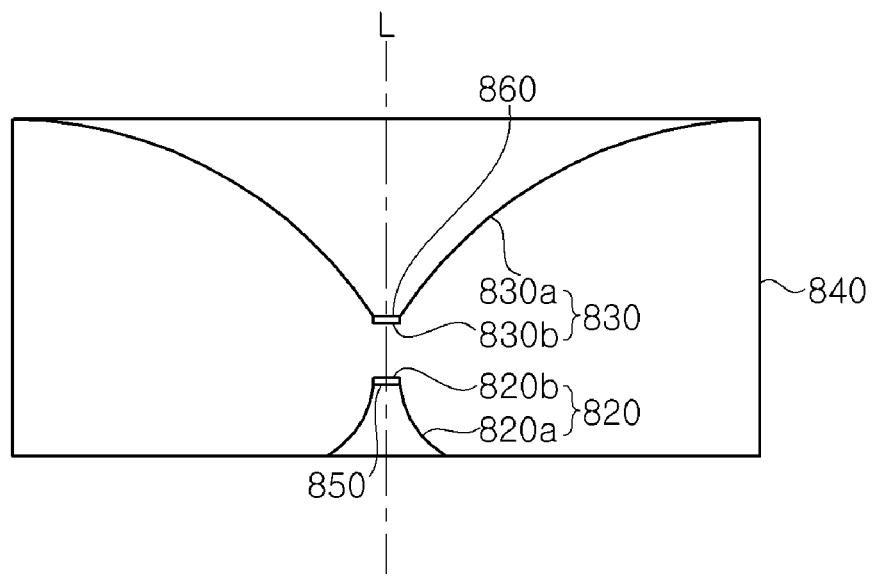
FIG. 9 is a sectional view of a light diffusing lens according to a fourth exemplary embodiment.

FIG. 9 is a sectional view of a light diffusing lens according to a fourth exemplary embodiment.

Referring to FIG. 9, a light diffusing lens 810 according to the fourth exemplary embodiment includes a light incident portion 820, a reflective portion 830, and a light exit portion 840.

The light exit portion 840 is the same as described and illustrated with respect to the light diffusing lens 210 (see FIG. 3) according to the first exemplary embodiment. Thus, the detailed description of the light exit portion 840 will be omitted for brevity.

The light incident portion 820 is placed at a lower portion of the light diffusing lens 810 and has a function of providing light to the entirety of the reflective portion 830 by uniformly dispersing light. The light incident portion 820 is placed at a center of a lower surface of the light diffusing lens 810 and has a concave shape depressed inwards from the lower surface of the light diffusing lens 810. The light incident portion 820 includes a first convex face 820a gradually narrowed in an inward direction of the light diffusing lens 810 and a first flat face 820b extending from the first convex face 820a. In particular, the first convex face 820a has a convex shape bulging in a direction of an optical axis L defined by a straight line passing through a center of the light diffusing lens 810. The first flat face 820b is disposed perpendicular to the optical axis L. The first flat face 820b includes a first reflection member 850. Here, although the first reflection member 850 may be formed by coating a reflective material, it should be understood that the present disclosure is not limited thereto. Alternatively, the first reflection member 850 may be formed by depositing a light absorption material. The first reflection member 850 serves to prevent hot spots. The first reflection member 850 reflects light focused through the center of the light diffusing lens 810.

The reflective portion 830 is placed at an upper portion of the light diffusing lens 810 and has a concave shape depressed inwards from the upper portion of the light diffusing lens 810 with respect to the optical axis L. The reflective portion 830 serves to reflect light received from the light incident portion 820 towards the light exit portion 840. The reflective portion 830 includes a second convex face 830a gradually narrowed in an inward direction of the light diffusing lens 810 and a second flat face 830b extending from the second convex face 830a. The second convex face 830a has a convex shape bulging in the direction of the optical axis L defined by the straight line passing through the center of the light diffusing lens 810. The second flat face 830b is disposed perpendicular to the optical axis L. The second flat face 830b includes a second reflection member 860. Here, although the second reflection member 860 may be formed by coating a reflective material, it should be understood that the present disclosure is not limited thereto. Alternatively, the second reflection member 860 may be formed by depositing a light absorption material. The second reflection member 860 serves to prevent hot spots. The second reflection member 860 reflects light focused through the center of the light diffusing lens 810.

In the light diffusing lens 810 according to the fourth exemplary embodiment, the light incident portion 820 and the reflective portion 830 include the first and the second flat faces 820b, 830b, respectively, and the first and second reflection members 850, 860 are placed on the first and second flat faces 820b, 830b, thereby preventing hot spots from occurring at the center of the light diffusing lens 810.

Figure 10:
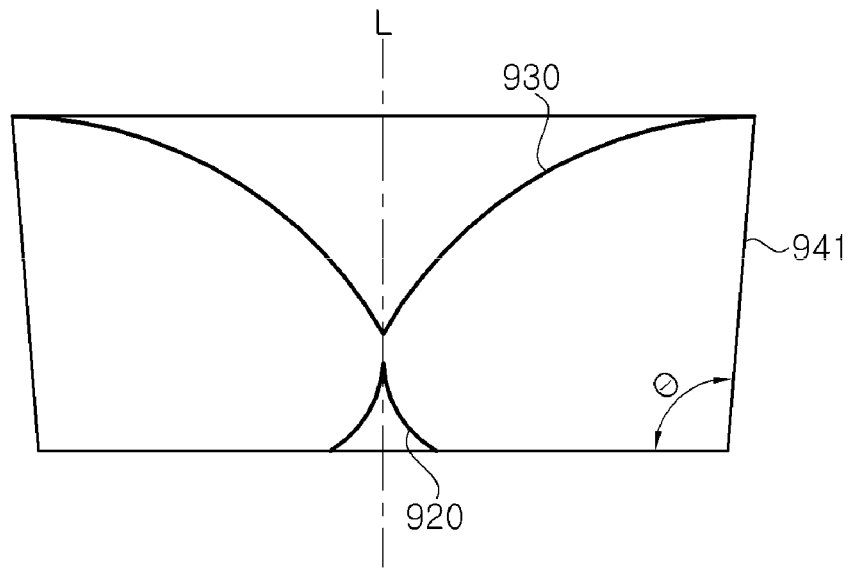
FIG. 10 is a sectional view of a light diffusing lens according to a fifth exemplary embodiment.
Figure 11:
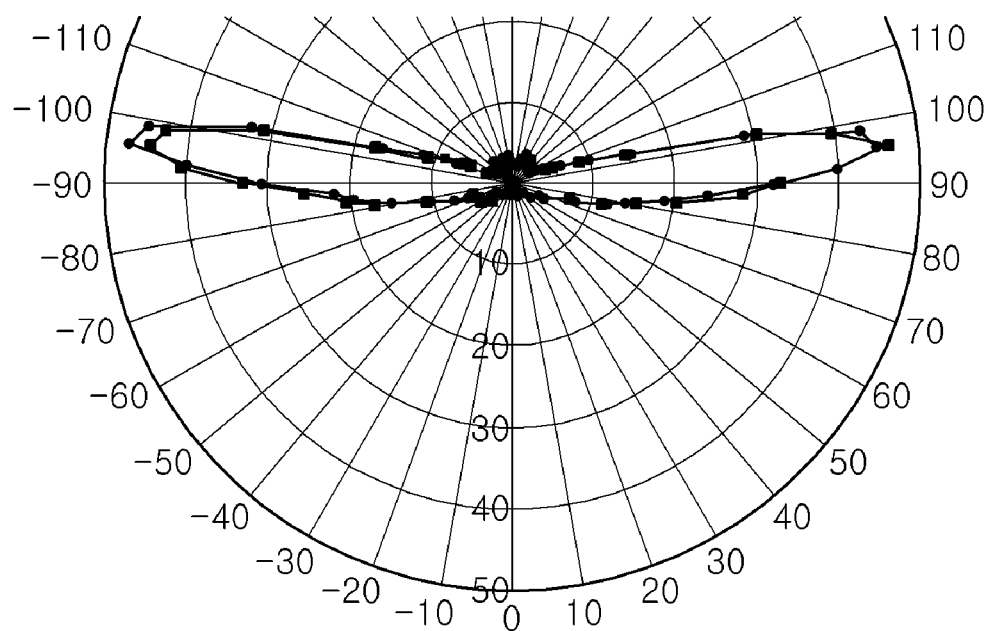
FIG. 11 is a diagram of a beam angle distribution of a light emitting device according to the fifth exemplary embodiment.

FIG. 10 is a sectional view of a light diffusing lens according to a fifth exemplary embodiment. FIG. 11 is a diagram of a beam angle distribution of a light emitting device according to the fifth exemplary embodiment.

Referring to FIG. 10 and FIG. 11, a light diffusing lens 910 according to the fifth exemplary embodiment includes a light incident portion 920, a reflective portion 930, and a light exit portion 940.

The light incident portion 920 and the reflective portion 930 are the same as those described and illustrated with respect to the light diffusing lens 210 (see FIG. 3) according to the first exemplary embodiment. Thus, the detailed descriptions of the light incident portion 920 and the reflective portion 930 will be omitted for brevity.

The light exit portion 940 has an angle θ of greater than about 90° with respect to a lower surface of the light diffusing lens 910. A beam angle distribution of the light emitting device can be changed by the angle θ defined between the light exit portion 940 and the lower surface of the light diffusing lens 910.

A light emitting device according to the fifth exemplary embodiment has a luminous intensity peak placed at an angle of about 100° or less from the optical axis L and thus provides a wide distribution of light through light spreading.

The light emitting device according to the fifth exemplary embodiment includes the light diffusing lens 910, which includes the light incident portion 920 providing uniform light to the entire surface of the reflective portion 930, the reflective portion 930 reflecting light towards the light exit portion 940, and the light exit portion 940 emitting light in an outward direction of the light diffusing lens 910, thereby providing a beam angle distribution focused in the lateral direction of the light emitting device. With this structure, the light emitting device according to the present disclosure can advantageously include a slim backlight unit when compared to conventional light emitting devices.

Figure 12:
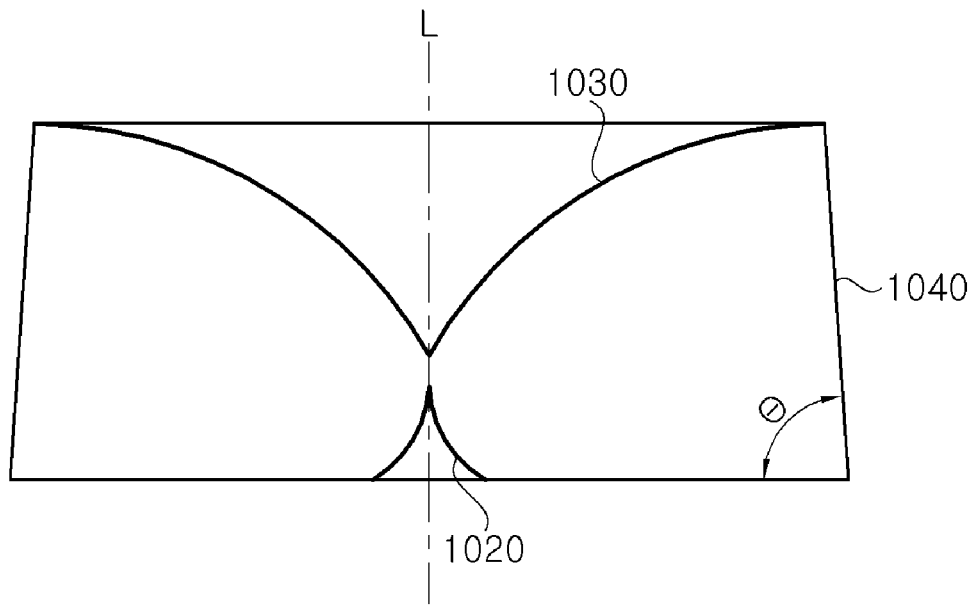
FIG. 12 is a sectional view of a light diffusing lens according to a sixth exemplary embodiment.

FIG. 12 is a sectional view of a light diffusing lens according to a sixth exemplary embodiment. FIG. 13 is a diagram of a beam angle distribution of a light emitting device according to the sixth exemplary embodiment.

Figure 13:
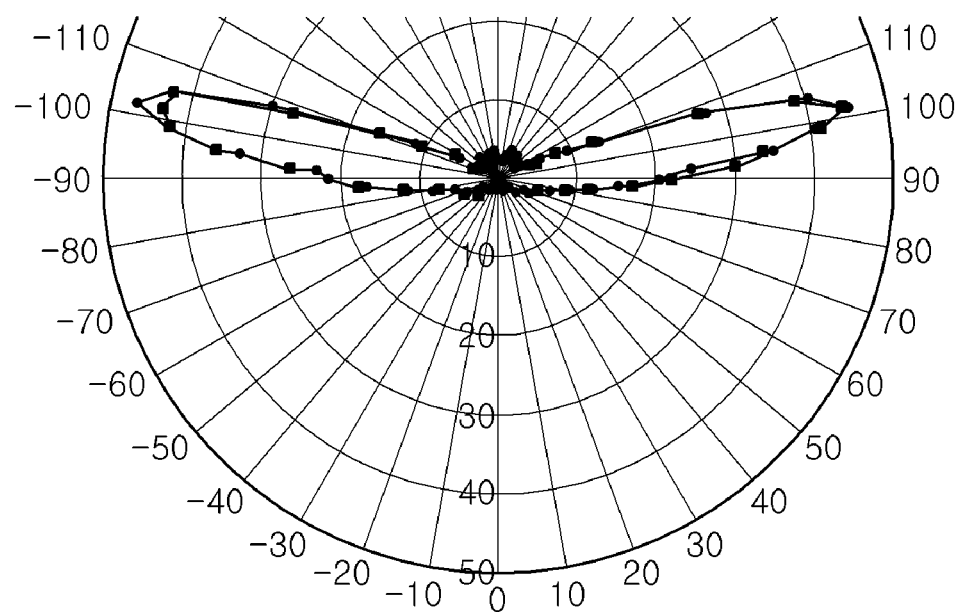
FIG. 13 is a diagram of a beam angle distribution of a light emitting device according to the sixth exemplary embodiment.

Referring to FIG. 12 and FIG. 13, a light diffusing lens 1010 according to the sixth exemplary embodiment includes a light incident portion 1020, a reflective portion 1030, and a light exit portion 1040.

The light incident portion 1020 and the reflective portion 1030 are the same as those described and illustrated with respect to the light diffusing lens 210 (see FIG. 3) according to the first exemplary embodiment. Thus, the detailed descriptions of the light incident portion 1020 and the reflective portion 1030 will be omitted for brevity.

The light exit portion 1040 has an angle θ of less than about 90° with respect to a lower surface of the light diffusing lens 1010. A beam angle distribution of the light emitting device can be changed by the angle θ defined between the light exit portion 1040 and the lower surface of the light diffusing lens 1010.

A light emitting device according to the sixth exemplary embodiment has a luminous intensity peak placed at an angle of about 100° or more from the optical axis L and thus provides a wide distribution of light through light spreading.

The light emitting device according to the sixth exemplary embodiment includes the light diffusing lens 1010, which includes the light incident portion 1020 providing uniform light to the entire surface of the reflective portion 1030, the reflective portion 1030 reflecting light towards the light exit portion 1040, and the light exit portion 1040 emitting light in an outward direction of the light diffusing lens 1010, thereby providing a beam angle distribution focused in the lateral direction of the light emitting device. With this structure, the light emitting device according to the present disclosure can advantageously realize a slim backlight unit.

Although some exemplary embodiments are disclosed herein, it should be understood that these embodiments are not intended to be exclusive. For example, individual structures, elements, or features of a particular embodiment are not limited to that particular embodiment and can be applied to other embodiments without departing from the spirit and scope of the present disclosure.

The invention claimed is:

1. A light diffusing lens, comprising:
   a light incident portion having a concave shape depressed inwards from a lower portion of the light diffusing lens;
   a reflective portion having a concave shape depressed inwards from an upper portion of the light diffusing lens; and
   a light exit portion defined by an outer side surface of the light diffusing lens,
   wherein the light incident portion comprises a first convex face bulging in a direction of an optical axis defined by a straight line passing through a center of the light diffusing lens,
   wherein the first convex face of the light incident portion extends directly from an inner apex of the light incident portion to a bottom surface of the light diffusing lens, and wherein an internal angle defined between the light exit portion and the bottom surface of the light diffusing lens is less than 90° C.

2. The light diffusing lens according to claim 1, wherein the first convex face of the light incident portion has a gradually increasing convexity in an inward direction of the light diffusing lens.

3. A light diffusing lens, comprising:
   a light incident portion having a concave shape depressed inwards from a lower portion of the light diffusing lens;
   a reflective portion having a concave shape depressed inwards from an upper portion of the light diffusing lens; and
   a light exit portion defined by an outer side surface of the light diffusing lens,
   wherein the light incident portion comprises a first convex face bulging in a direction of an optical axis defined by a straight line passing through a center of the light diffusing lens, wherein the light incident portion further comprises a first flat face extending in a perpendicular direction with respect to the optical axis of the light diffusing lens,
   wherein an absorption member is disposed on the first flat face of the light incident portion and is configured to absorb light.

4. The light diffusing lens according to claim 3, wherein the reflective portion further comprises a first convex face bulging in the direction of the optical axis.

5. The light diffusing lens according to claim 4, wherein the reflective portion further comprises a first flat face extending in a perpendicular direction with respect to the optical axis of the light diffusing lens.

6. The light diffusing lens according to claim 5, further comprising:
   a reflection member disposed on the first flat face of the reflective portion and configured to reflect light or an absorption member disposed on the first flat face of the reflective portion and configured to absorb light.

7. The light diffusing lens according to claim 4, wherein the light exit portion comprises a convex face bulging in an outward direction of the light diffusing lens.

8. A light diffusing lens, comprising:
   a light incident portion having a concave shape depressed inwards from a lower portion of the light diffusing lens;
   a reflective portion having a concave shape depressed inwards from an upper portion of the light diffusing lens; and
   a light exit portion defined by an outer side surface of the light diffusing lens, wherein the light incident portion comprises a first surface slanted with respect to a direction of an optical axis defined by a straight line passing through a center of the light diffusing lens, wherein the light incident portion further comprises a second surface slanted with respect to the optical axis, wherein the first surface of the light incident portion extends directly from an inner apex of the light incident portion to the second surface of the light incident portion, wherein the second surface of the light incident portion extends from the first surface of the light incident portion to a lower surface of the light diffusing lens, wherein the first and second surfaces of the light incident portion have different oblique angles with respect to the optical axis.

9. A light emitting device, comprising:

a light emitting element; and a light diffusing lens disposed on the light emitting element and comprising a light incident portion, a reflective portion, and a light exit portion, wherein the light incident portion has a concave shape depressed inwards from a lower portion of the light diffusing lens, the reflective portion has a concave shape depressed inwards from an upper portion of the light diffusing lens, and the light exit portion is defined by an outer side surface of the light diffusing lens, and wherein the light incident portion comprises a first convex face bulging in a direction of an optical axis defined by a straight line passing through a center of the light diffusing lens, wherein the first convex face of the light incident portion extends directly from an inner apex of the light incident portion to a lower surface of the light diffusing lens, and wherein an internal angle defined between the light exit portion and the lower surface of the light diffusing lens is less than 90°.

* * * * *